United States Patent

[11] 3,544,786

| [72] | Inventor | Alfred Dickens Baker<br>Solihull, England |
|---|---|---|
| [21] | Appl. No. | 691,846 |
| [22] | Filed | Dec. 19, 1967 |
| [45] | Patented | Dec. 1, 1970 |
| [73] | Assignee | Joseph Lucas (Industries) Limited<br>Birmingham, England<br>a British Company |
| [32] | Priority | Dec. 21, 1966 |
| [33] | | Great Britain |
| [31] | | No. 57182/66 |

[54] BODIES FOR ROAD VEHICLES
11 Claims, 4 Drawing Figs.

[52] U.S. Cl. .................................................. 240/46.29,
240/7.1, 246/1
[51] Int. Cl. ...................................................... F21v 11/18
[50] Field of Search ............................................ 240/7.1(H),
7.1, 46.29; 296/136, 37, 137(B), 1

[56] References Cited
UNITED STATES PATENTS

| 2,268,164 | 12/1941 | Oleksiw | 296/37 |
|---|---|---|---|
| 2,569,218 | 9/1951 | Bailey | 296/1 |
| 2,324,742 | 7/1943 | Voorhees et al. | 240/7.1(H)U |
| 2,331,973 | 10/1943 | Grose | 240/7.1(H)U |
| 2,388,787 | 11/1945 | Kuschel et al. | 240/7.1(H)U |
| 3,070,687 | 12/1962 | Marchant | 240/7.1(H)U |
| 3,325,636 | 6/1967 | Roberts et al. | 240/7.1(H)U |

FOREIGN PATENTS

| 871,469 | 6/1961 | Great Britain | 296/137(B) |
|---|---|---|---|

Primary Examiner—John M. Horan
Assistant Examiner—D. J. Clement
Attorney—Holman, Glascock, Downing & Seebold ABSTRACT: A body for a road vehicle includes a forward bulkhead on which the headlamps of the vehicle are mounted. A forwardly presented portion of the vehicle body is mounted on a pivoting linkage arrangement which permits movement of the portion of the body between a first position wherein the portion of the body masks the headlamp assemblies on both sides of the vehicle, and conforms to the remainder of the body work of the vehicle, and a second position wherein the headlamp units on both sides of the vehicle are exposed for use. The body portion is movable on the linkage arrangement by means of a vacuum-operated ram which is controlled through a solenoid-operated valve which in turn is controlled by the lighting switch of the vehicle.

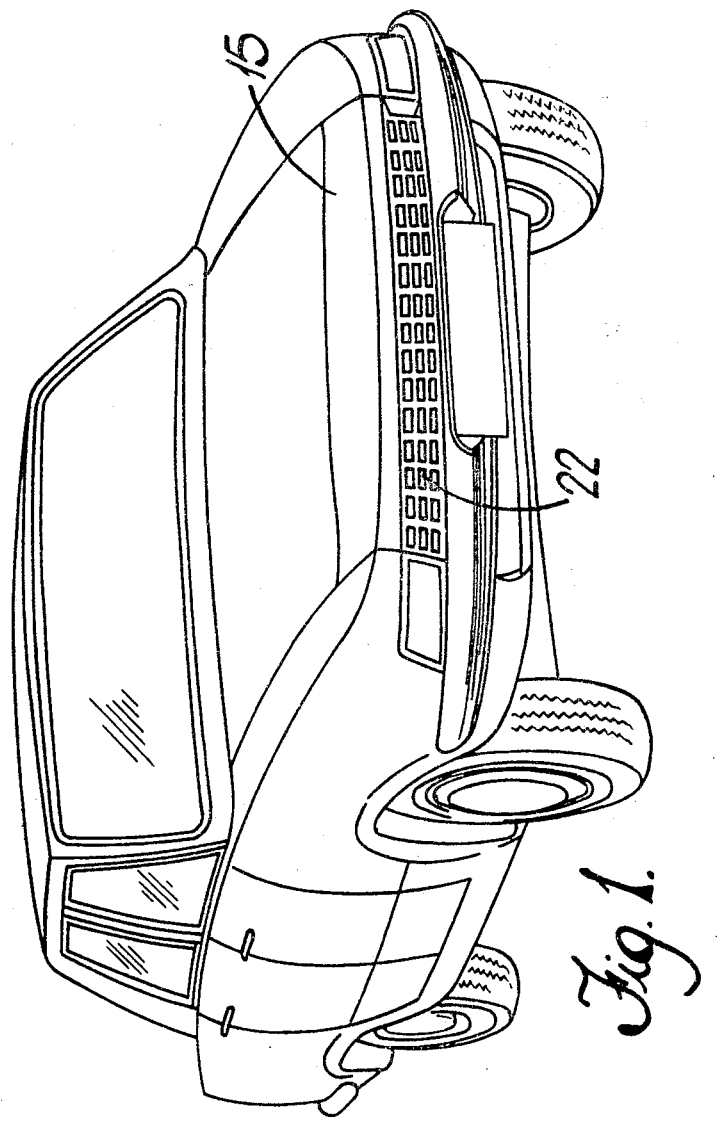

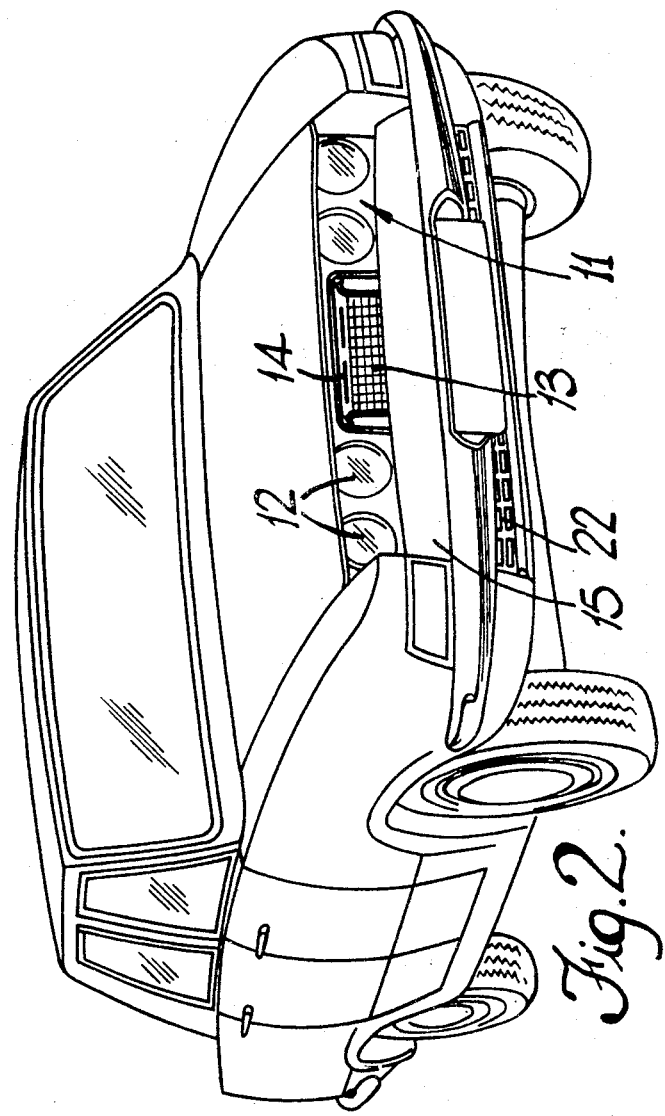

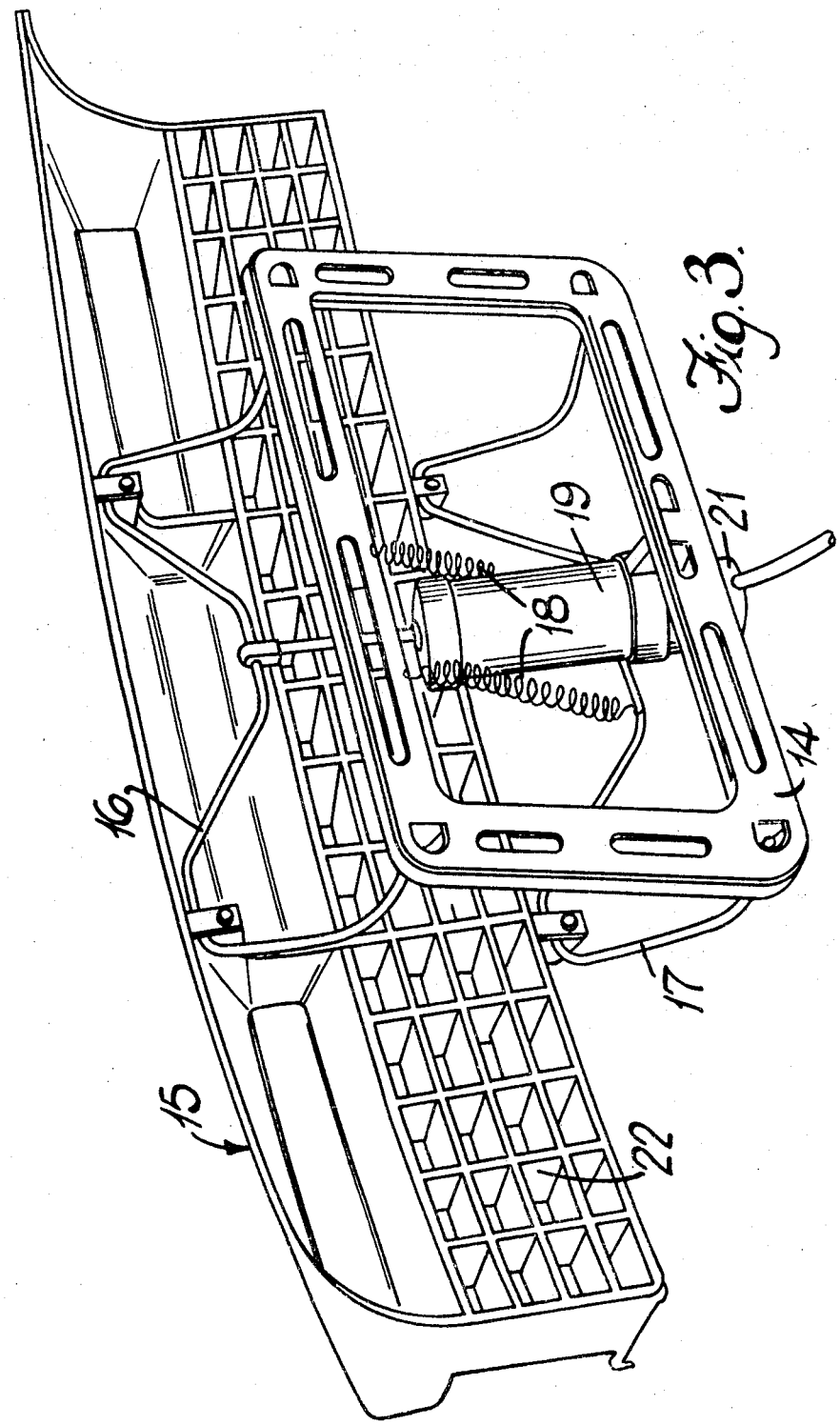

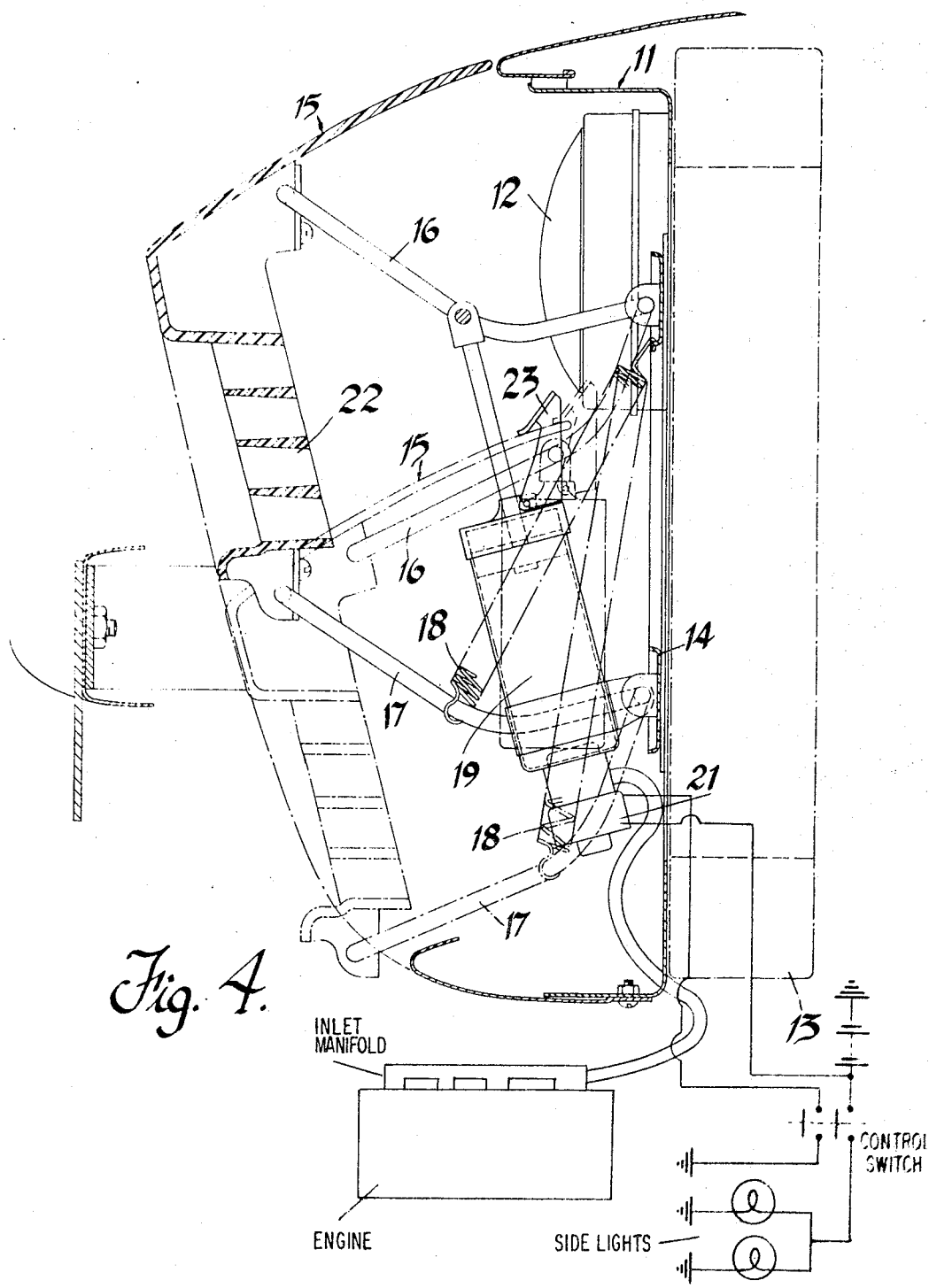

BODIES FOR ROAD VEHICLES

This invention relates to bodies for road vehicles.

A body according to the invention includes a forward bulkhead on which the headlamps of the vehicle are mounted and a shutter member movable with respect to said bulkhead between a first position in which it conceals the headlamps of the vehicle are mounted and a shutter member movable with respect to said bulkhead between a first position in which it conceals the headlamps and in which it defines part of the exterior shape of the body, and a second position in which the headlamps are exposed.

The invention further resides in a shutter assembly for use in a road vehicle body.

One example of the invention is illustrated in the accompanying drawings wherein:

FIG. 1 is a front perspective view of a road vehicle with the shutter member in its closed position;

FIG. 2 is a view similar to FIG. 1 showing the shutter member in its open position;

FIG. 3 is a rear perspective view of the shutter assembly in its closed position; and FIG. 4 is a sectional view of the shutter assembly in its closed position, the open position of the assembly being shown dotted.

Referring to the drawings, the road vehicle body includes a forward bulkhead 11 on which are mounted the headlamps 12 and the radiator 13 of the vehicle, the headlamps being mounted on the bulkhead in a position to conform to the legal requirements governing headlamp positioning on road vehicles. Secured to the bulkhead 11 and surrounding the radiator 13 is a rectangular frame 14 which supports a shutter member 15 through a parallelogram linkage 16, 17.

The shutter member 15 is movable between a first position in which it conceals the headlamps 12 and a second position in which the headlamps 12 are exposed, the member 15 being urged to its first position by springs 18 acting between the linkage 16, 17 and the frame 14. In its second position the member 15 is housed in the vehicle body below the radiator.

The shutter member 15 is moved to its second position by a pneumatic ram 19, acting between the linkage 16, 17 and frame 14. The ram 19 is connected to a source of vacuum, conveniently a vacuum tank associated with the inlet manifold of the engine, through a solenoid-operated control valve 21. The control valve 21 normally connects the ram 19 to atmosphere so that the member 15 is maintained in its first position by the springs 18. However when the valve 21 is energised, for example, in response to energisation of the side lights of the vehicle, the ram 19 is connected to the source of vacuum and so moves the member 15 to its second position to expose the headlamps 12, the member 15 being maintained in its second position while the valve 21 is energised. In the event of failure of the ram 19 to operate the member 15 can be operated manually from inside the vehicle by means of a lever linkage or a Bowden cable, a catch 23 (FIG. 4) being provided to maintain the member 15 in its second position.

The member 15 includes an air intake grille 22 for the radiator 13.

It will be appreciated that in road vehicles wherein the headlamps are carried on the exterior of the vehicle body the aerodynamic shape of the body is limited by the necessity to position the headlamps to conform with legal requirements. However in a construction as described above, the headlamps are mounted on the bulkhead 11 so as to conform to legal requirements and so the shutter member 15 which usually covers the headlamps can be designed to impart the optimum aerodynamic shape to the body of the vehicle without regard for the position of the headlamps.

In a modification the frame 14 is omitted and the linkages 16, 17, the headlamp 12 and the radiator 13 are secured to a bulkhead member which is fitted, as a unit to the vehicle during assembly of the vehicle.

I claim:

1. A body for a road vehicle including:
    a forward bulkhead;
    a pair of headlamp units;
    means mounting said headlamp units on said forward bulkhead on opposite sides of the longitudinal axis of the vehicle, so that said headlamp units constitute left-hand and right-hand headlamp units of the vehicle respectively;
    a single shutter member extending generally parallel with said bulkhead, and being of a length at least as great as the spacing between the headlamp units;
    means mounting said shutter member for movement relative to said bulkhead between a first position in which the shutter member conceals both of the headlamp units, and in which the shutter member along its entire length defines part of the exterior shape of the body of the vehicle, and a second position in which both of the headlamp units are exposed; and
    means for moving said shutter member.

2. A body as claimed in claim 1 wherein said shutter member is carried by a parallelogram linkage supported by the bulkhead.

3. A body as claimed in claim 2 wherein said linkage is engaged with a frame which is secured to said bulkhead.

4. A body as claimed in claim 1 wherein the shutter member is moved to its second position by a vacuum-operable ram and is urged to its first position by resilient means.

5. A body as claimed in claim 4 wherein the vacuum for operating said ram is derived from the inlet manifold of the engine of the vehicle.

6. A body as claimed in claim 1 wherein said shutter is movable to its second position manually from inside the vehicle.

7. A body as claimed in claim 4 wherein said ram is connected to the vacuum source through a solenoid-operated valve.

8. A body as claimed in claim 7 wherein said valve is energised to connect said ram to said vacuum source when the side lights of the vehicle are energised.

9. A body as claimed in claim 1 wherein the bulkhead carries the radiator of the vehicle and said shutter member includes a grille through which cooling air can flow in use to said radiator.

10. A shutter assembly for use in a body for a road vehicle including a frame adapted to be secured to a forward bulkhead of the vehicle, said bulkhead carrying right and left headlamps an opposite sides of the longitudinal axis of the vehicle, and a parallelogram linkage secured to said frame an carrying a single shutter member, said shutter member being movable relative to said bulkhead on said linkage in use, from a first position wherein said shutter member conceals both said headlamps and defines across its entire length a part of the exterior shape of the vehicle body, against the action of resilient means to a second position in which said headlamps are exposed.

11. A shutter assembly for use in a body for a road vehicle, including a bulkhead adapted to be built into the vehicle during assembly of the vehicle, right and left headlamps secured to the bulkhead on opposite sides of the longitudinal axis of the vehicle, a radiator secured to the bulkhead, and a parallelogram linkage connected at one end to the bulkhead and carrying a single shutter member at its other end, said shutter member being movable relative to the bulkhead on said linkage from a first position wherein said shutter conceals both said headlamps and in use constitutes across its entire length part of the exterior shape of the vehicle body, against the action of resilient means to a second position wherein said headlamps are exposed.